United States Patent
Prud'Homme-Lacroix

(10) Patent No.: US 9,517,828 B2
(45) Date of Patent: Dec. 13, 2016

(54) AIRCRAFT FUSELAGE FRAME MADE OF LAMINATED COMPOSITE MATERIALS AND INCLUDING REINFORCEMENT CURVED ZONES OF VARYING VALUE OF RADIUS OF CURVATURE

(71) Applicant: AIRBUS HELICOPTERS, Marignane (FR)

(72) Inventor: Pierre Prud'Homme-Lacroix, Vitrolles (FR)

(73) Assignee: Airbus Helicopters, Marignane (FR)

( * ) Notice: Subject to any disclaimer, the term of this patent is extended or adjusted under 35 U.S.C. 154(b) by 636 days.

(21) Appl. No.: 14/445,448

(22) Filed: Jul. 29, 2014

(65) Prior Publication Data

US 2015/0344118 A1    Dec. 3, 2015

(30) Foreign Application Priority Data

Jul. 30, 2013  (FR) ..................... 13 01833

(51) Int. Cl.
*B64C 1/00* (2006.01)
*B64C 1/06* (2006.01)

(52) U.S. Cl.
CPC ....... *B64C 1/061* (2013.01); *B64C 2001/0072* (2013.01); *Y02T 50/433* (2013.01)

(58) Field of Classification Search
USPC ............................. 244/119, 120, 129.1, 125
See application file for complete search history.

(56) References Cited

U.S. PATENT DOCUMENTS

| | | | | |
|---|---|---|---|---|
| 4,955,803 | A * | 9/1990 | Miller | B29C 53/043 264/339 |
| 5,024,399 | A * | 6/1991 | Barquet | B29C 70/44 244/119 |
| 5,866,272 | A * | 2/1999 | Westre | B32B 3/12 244/119 |
| 8,292,226 | B2 * | 10/2012 | Sankrithi | B64C 1/061 244/117 R |
| 8,349,105 | B2 * | 1/2013 | Kehrl | B29C 70/207 156/285 |
| 2005/0067731 | A1 * | 3/2005 | Bruyere | B29C 70/382 264/171.1 |

(Continued)

FOREIGN PATENT DOCUMENTS

| | | |
|---|---|---|
| EP | 0346210 | 12/1989 |
| WO | 2009112694 | 9/2009 |

OTHER PUBLICATIONS

French Search Report for FR 1301833, Completed by the French Patent Office on May 8, 2014, 7 Pages.

*Primary Examiner* — Christopher P Ellis
(74) *Attorney, Agent, or Firm* — Brooks Kushman P.C.

(57) ABSTRACT

A structural frame for a fuselage of an aircraft. The frame is formed from a composite material profile comprising curved zones (7) that interconnect together zones to be joined of the frame, having respective orientations. Each of the curved zones (7) of the frame is geometrically defined by at least one radius of curvature. The value of the radius of curvature (R2), geometrically defining a curved zone (7) of the frame varies as a function of the curvilinear abscissa of each points on the inside periphery of the inside flange from any point of the curved zone relative to a given reference point (P1).

7 Claims, 5 Drawing Sheets

(56) References Cited

U.S. PATENT DOCUMENTS

| | | | |
|---|---|---|---|
| 2007/0161483 A1* | 7/2007 | Raf | B29C 70/345 493/296 |
| 2008/0179460 A1 | 7/2008 | Rodriguez et al. | |
| 2009/0202763 A1 | 8/2009 | Rose et al. | |
| 2010/0136293 A1 | 6/2010 | Kubryk et al. | |
| 2012/0211602 A1* | 8/2012 | Dugerie | B64C 1/1461 244/119 |
| 2015/0122939 A1* | 5/2015 | Bistuer | B64C 1/061 244/17.11 |
| 2015/0225061 A1* | 8/2015 | Beumler | B32B 5/02 244/13 |

\* cited by examiner

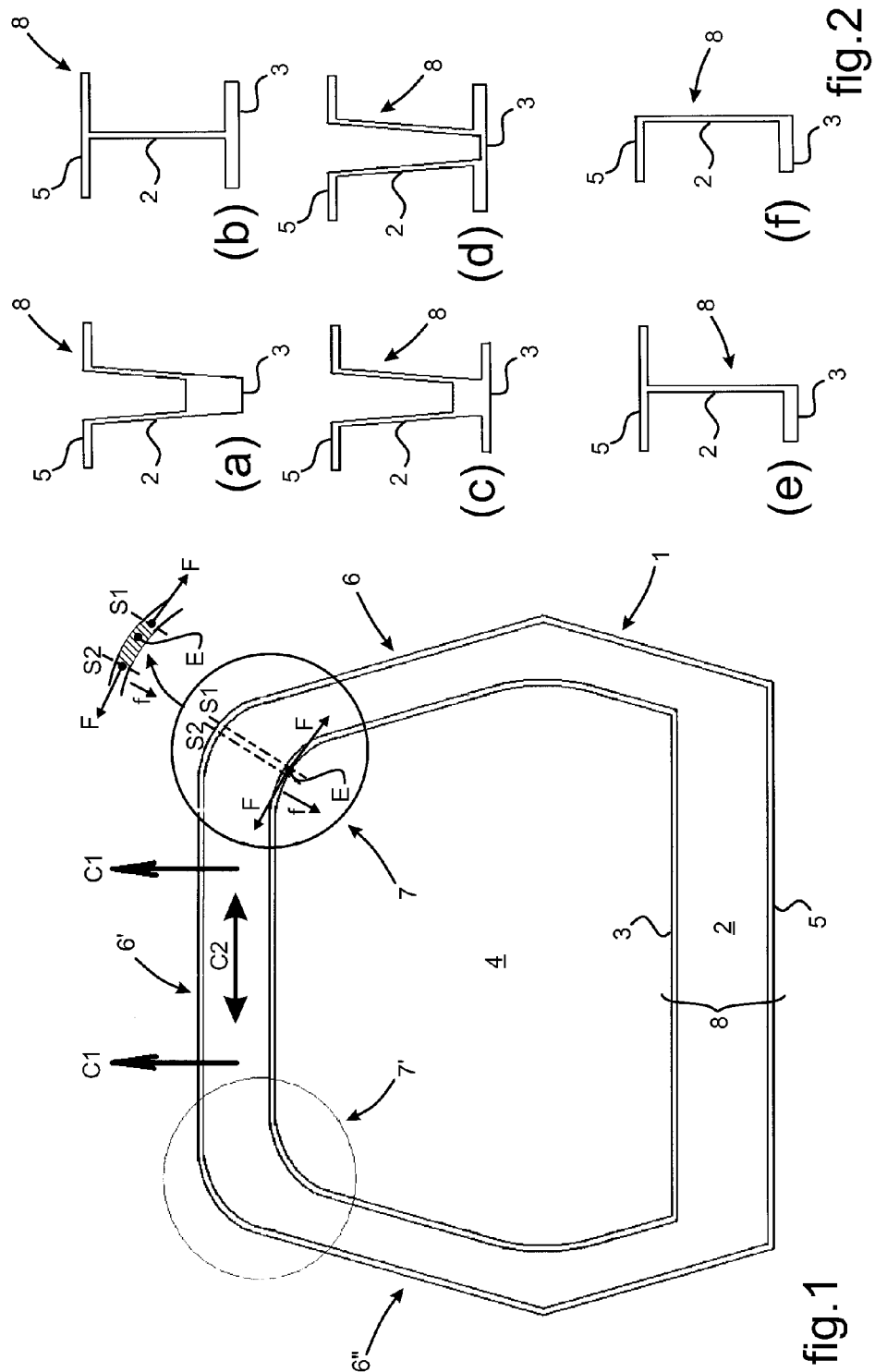

AIRCRAFT FUSELAGE FRAME MADE OF LAMINATED COMPOSITE MATERIALS AND INCLUDING REINFORCEMENT CURVED ZONES OF VARYING VALUE OF RADIUS OF CURVATURE

CROSS REFERENCE TO RELATED APPLICATION

This application claims priority to French patent application No. FR 13 01833 filed on Jul. 30, 2013, the disclosure of which is incorporated in its entirety by reference herein.

BACKGROUND OF THE INVENTION (1) Field of the Invention

The present invention lies within the field of shaping frames made of laminated composite materials in order to form structural elements of an aircraft fuselage. The present invention relates more particularly to the layout of a zone of reinforcement of such a frame that is shaped into a curve and that interconnects two zones of the frame to be joined together, each such zone to be joined together having a respective orientation.

In the field of aviation, aircraft fuselages are typically arranged as a longitudinally elongate shell. Such a shell is primarily made as a skin covering a framework. The framework is made up in particular of load-bearing members or skin-stiffening members that are arranged and fastened together in order to confer a desired shape to the shell. Among such stiffening members, some are shaped as frames that may either be open or closed. The frames may potentially be of any shape, being defined depending on shape requirements for the framework.

(2) Description of Related Art

Such a frame is commonly made from a profile that is shaped to confer a desired shape to the frame. The profile presents a cross section of any shape, which cross section is determined depending on the strength and stiffness desired for the frame given the forces to which it is subjected. Such a profile commonly comprises a core of elongate cross section that is suitable for being provided with a flange at at least one of its ends. The profile may also comprise two flanges disposed at either end of the core, i.e. an inside flange facing towards the inside recess of the frame and an outside flange facing towards the outside of the frame. Such a configuration for the cross section of a profile having two flanges may provide a cross section in the shape of the letter C, I, J, or Ω, for example.

The profile may be built up from laminated composite materials, having various layers (or "strates" [plies] in the terminology of the "*Dictionnaire Encyclopédique des Matériaux* Composites" [Encyclopedic Dictionary of Composite Materials], WEKA INDUSTRIE, 1985, updated 1988) that are made of a stack of superposed fabrics or sheets. The fibers of the sheets extend in directions that depend on specific strength and stiffness requirements of the frame. The various layers of composite materials conventionally associate sheets having fibers that are unidirectional or almost-unidirectional with sheets having fibers that are bidirectional, then referred to as "woven fabrics".

Conventionally, a sheet is made up of unidirectional fibers, i.e. fibers all extending in a single direction. Such a sheet is optionally packaged as a roll or reel that makes it possible to use it in a filament depositing machine. Woven fabrics are packaged in rolls and include fibers extending in the warp direction of the fabric and fibers extending in the weft direction of the fabric. For a sheet with almost all its fibers unidirectional, optionally referred to as "unidirectional woven fabric", almost all of the fibers extend in the warp direction of the fabric, with the remainder of the fibers extending in the weft direction of the fabric. For woven fabric with bidirectional fibers, the fibers are generally distributed substantially equally between the warp direction and the weft direction of the fabric.

Typically, bending forces on the frame generate in the profile both shear stresses and perpendicular angle stresses extending in the long direction of the profile. Conventionally, the perpendicular angle stresses are taken up by the flanges, e.g. by unidirectional fibers, and shear stress is taken up by the core, e.g. by bidirectional fabrics with fibers that then extend mainly at ±45°. Naturally, fabrics having bidirectional fibers may also be incorporated in the flanges in addition to the unidirectional fibers.

In this context, the frame may include curved zones interconnecting zones of the frame to be joined together, which said zones to be joined together are located at respective ends of a given curved zone. Typically, the various curved zones of the frame interconnect the zones to be joined together, and each of them is geometrically defined by a radius of curvature identified by a value and by a center of curvature in a position that is constant relative to the frame. For illustrative purposes, a said curved zone is commonly located in a corner of the frame in order to interconnect zones to be joined together that extend in straight lines.

By way of example, reference is made to US documents 2010/136293 (KUBRYK VANESSA et al.), EP 0 346 210 (AEROSPATIALE), US 2009/202763 (ROSE DONALD et al.), and US 2008/179460 (RODRIGUEZ ELENA AREVALVO et al.) that describe such a frame used to form the fuselage of an aircraft.

However, when the perpendicular angle stresses to which the profile is subjected in the curved zone of the frame are in equilibrium, that generates stresses in the flanges that extend perpendicularly to the planes of the flanges. It has been observed that such stresses, referred to as delamination stresses, are proportional to said perpendicular angle stresses divided by the value of the radius of curvature of the curved zone under consideration of the frame, and they tend to cause delamination of the profile, in particular in the junction zones between the core and the flanges.

In theory, the delamination stresses are taken up by adhesively bonding the sheets to one another. However, the ability of composite materials to withstand delamination stresses is low, because the various sheets constituting the composite materials forming the profile usually have no fibers that extend along the direction of the delamination stresses. As a result, the delamination stresses act on the matrix of the composite material, the strength of said matrix being significantly lower than that of the fibers.

This shows that it is necessary to reinforce the curved zones of the frame in order to avoid delamination of the profile, and more particularly delamination of an inside flange of the profile, whenever the bending moment that is applied to said profile and that is of axis perpendicular to the core tends to put the inside flange of the frame into traction.

Among the current solutions aiming to reinforce the curved zones of a composite material frame, it is possible to select a value for the radius of curvature of a curved zone to be considerable, or for the flanges of the profile to be overdimensioned.

Other known solutions for avoiding separation of the sheets in the event of delamination of the profile consist in using rivets or in assembling the various sheets of the flanges together by stitching, or even in placing reinforcing gussets in the curved zones.

Although expensive and difficult to implement while fabricating the profile, another possible solution consists in using sheets of fabric having multidirectional fibers. However, in that solution, it is necessary to use three-dimensional weaving to make the profile, or at least its flange.

For information about a technological environment that is close to the present invention, reference may be made to document WO2009/112694 (AIRBUS OPERATION SAS) that describes an embodiment of a structural frame of an aircraft fuselage and a method of fabricating such a frame.

BRIEF SUMMARY OF THE INVENTION

The present invention provides a structural frame for an aircraft fuselage, said frame comprising curved zones interconnecting together zones of the frame, called thereafter "zones to be joined", that are located at respective ends of a given curved zone.

The context of the present invention relates more specifically to a laminated composite material profile, said profile being shaped to form the frame and comprising a core bordered at least by one flange, comprising at least an inside flange or also an outside flange.

The object of the present invention is to provide such a frame having curved zones that are reinforced against said delamination stresses. The present invention seeks to obtain a said frame that is strong, in particular against said delamination stresses, while being able to be fabricated at low cost and while also limiting as much as possible the volume occupied by the profile in order to optimize the space available inside the cabin provided by the fuselage of the aircraft.

More specifically, the approach of the present invention lies more particularly in searching for a specific configuration of the geometry defining the curved zones of the frame. Such an approach aims to preserve the profile and more particularly the inside flange that it includes from delaminating when said inside flange is put into traction.

In accordance with this approach, the present invention is based on reducing the level of the delamination stresses in a flange of the frame, and in particular in an inside flange of the frame, and therefore on reducing the perpendicular angle stress levels in traction in any cross section of the profile, which perpendicular angle stress levels are proportional to the delamination stresses.

To do this, it has been found that the perpendicular angle force in said flange resulting from summing said perpendicular angle stresses, must be inversely proportional to the curvature of the frame, and must thus be proportional to the radius of curvature of a curved zone of the frame under consideration. In other words, for increasing perpendicular angle force in the profile, the radius of curvature of a curved zone of the frame under consideration must be defined as being correspondingly larger, since a radius of curvature of large value reduces the delamination stresses, which stresses are inversely proportional to said radius of curvature.

In this situation, the frame of the present invention is a frame of the type formed by a laminated composite material profile comprising a core bordered at least by an inside flange facing towards the inside recess of the frame. The frame includes curved zones, each of which is geometrically defined by at least one radius of curvature. Such curved zones interconnect said zones to be joined of the frame and that extend in respective distinct directions.

Typically, said radius of curvature of a curved zone under consideration is geometrically defined by a value and by a center of curvature having a position that is invariable relative to the inside periphery of the frame located towards the inside recess of the frame.

According to the present invention, said at least one radius of curvature geometrically defining at least one curved zone of the frame at least in part, is variable. Such variable radius of curvature have a value that varies according to the curvilinear abscissa of each points on the inside periphery of the inside flange facing towards the inside recess of the frame, referred to below more simply as the "curvilinear abscissa", from any point of the curved zone relative to a given reference point.

These provisions are such that the radius of curvature geometrically defining said curved zone is not a constant value, but a value that varies along the curved zone as a function of the said curvilinear abscissa.

In this context, the value of the varying radius of curvature varies relative to anyone arbitrary given reference point. The value of the said varying radius of curvature may vary in steps, or alternatively and preferably it may vary continuously, the value of the said varying radius of curvature in this example of continuous variation, then varying at each of its any one geometrical points defining the curved zone at least in part.

In other words, for a given range of a curved zone under consideration, the varying radius of curvature comprises at least two different values, which at least two values may be respective constant values that are distinct from each other, or else the value of the varying radius of curvature varies continuously.

The resulting shape obtained for the curved zone imparts resistance to delamination to the profile in this curved zone that matches the delamination stresses, while also limiting the transverse extent of the cross section of the profile as much as possible.

For a frame of a given resistance to delamination, such a limitation on the transverse extent of the profile, also serves to limit the weight of the frame or even to optimize dimensions of the inside recess of the frame. Limiting the weight of the frame is particularly useful in the field of aviation where it is constantly sought to reduce the weight of aircraft. Optimizing the dimensions of the inside recess of the frame is particularly useful when the frame defines the transverse size of the cabin formed by the fuselage.

This shows that the shaping of the curved zones of the frame gives rise to a satisfactory compromise between preserving the profile from the delamination that might be induced by said delamination stresses, and a profile of volume that is limited as much as possible, thereby making it possible to reduce the weight of the frame or also to optimize the space provided in the cabin formed by the fuselage when said frame defines the transverse size of the cabin.

The variation in the value of the varying radius of curvature is defined in particular as a function of the said curvilinear abscissa in application of a mathematical formula.

Said mathematical formula is selected to cause the value of the varying radius of curvature to vary so as to achieve the sought-after compromise as well as possible, while also preferably taking account of the stressing conditions of the profile onboard the aircraft and of its sought-after resistance to delamination in various situations, such as in an ordinary situation of frame stressing in an aircraft in flight, or in an aircraft in a crash situation.

By way of example, considering the aircraft in an ordinary flight situation, it is possible to avoid delamination of the profile according to the said curvilinear abscissa under consideration by locally increasing the value of the varying radius of curvature while taking account of a tolerated flux threshold for delamination stress in the curved zone. Considering the aircraft in a crash situation, a local value of the varying radius of curvature may be small, but it must ensure that a sufficient predefined final failure threshold for the inside flange is conserved, given the stresses to which the frame might be subjected (i.e. a margin that is sufficient over the final failure threshold of the inside flange).

It appears that satisfactory results are obtained by defining the variation in the value of the varying radius of curvature linearly according to a clothoid as a function of the said curvilinear abscissa.

However, other mathematical functions and/or formulas can be applied depending on requirements, the parameters and their individual values characterizing such mathematical functions and/or formulas naturally being determined to give a varying radius of curvature that enables the profile to resist delamination under the operating and stressing conditions applied to the frame on board an aircraft of given structure.

By way of example, the variation in the value of the varying radius of curvature may be defined by a polynomial function of the said curvilinear abscissa.

Again, by way of example, the variation in the value of the varying radius of curvature may be defined by the square of the said curvilinear abscissa.

Again, by way of example, the variation in the value of the varying radius of curvature may be defined by a logarithmic function of the said curvilinear abscissa.

Again, by way of example, the variation in the value of the varying radius of curvature may be defined by an exponential function of the said curvilinear abscissa.

In an embodiment, at least one curved zone of the frame is geometrically defined by at least two distinct successive radii of curvature, at least one of which being a said varying radius of curvature.

By way of example, among said successive radii of curvature, at least a first radius of curvature is a radius of curvature at a constant value and at least a second radius of curvature is a said varying radius of curvature.

Again, by way of example, the successive radii of curvature are varying radii of curvature having respective variations in value that are optionally defined by distinct mathematical formulas.

The value of the varying radius of curvature defining the curved zone at least in part, is preferably established lower than a threshold value that is predefined by the resistance of the profile to delamination under given stressing conditions of the profile on-board the aircraft, beyond which threshold value a risk of the profile delaminating in an operation situation would be confirmed by a crack being initiated and propagating.

Such a threshold value may for example be identified relative to a flux of delamination stresses applied locally in the curved zone, by taking into account various predefined stressing situations for the frame, such as an ordinary aircraft flight situation or a crash situation.

BRIEF DESCRIPTION OF THE SEVERAL VIEWS OF THE DRAWINGS

Embodiments of the present invention are described with reference to the figures of the accompanying sheets, in which:

FIG. 1 is an illustration of an embodiment of a prior art frame conventionally included in an aircraft fuselage.

FIG. 2 is made up of several diagrams given references (a), (b), (c), (d), (e), and (f) respectively, each showing a different example of the shape of the cross section of a profile forming a structural frame of an aircraft fuselage such as the frame shown by way of example in FIG. 1.

the diagram (g) shows a curved zone of a prior art frame defined along a radius of curvature R1 of value that is constant;

the diagram (h) shows the forces (Fn) withstood by an inside flange of the frame shown in diagram (g), as a function of the said curvilinear abscissa (A);

the diagram (i) shows the value (V) of the constant curvature of the curved zone as a function of the curvilinear abscissa (A); and the diagram (j) shows the variation of the delamination stress flux (G) withstood by the inside flange of the frame shown in the diagram (g), as a function of the said curvilinear abscissa (A).

Figure 4:
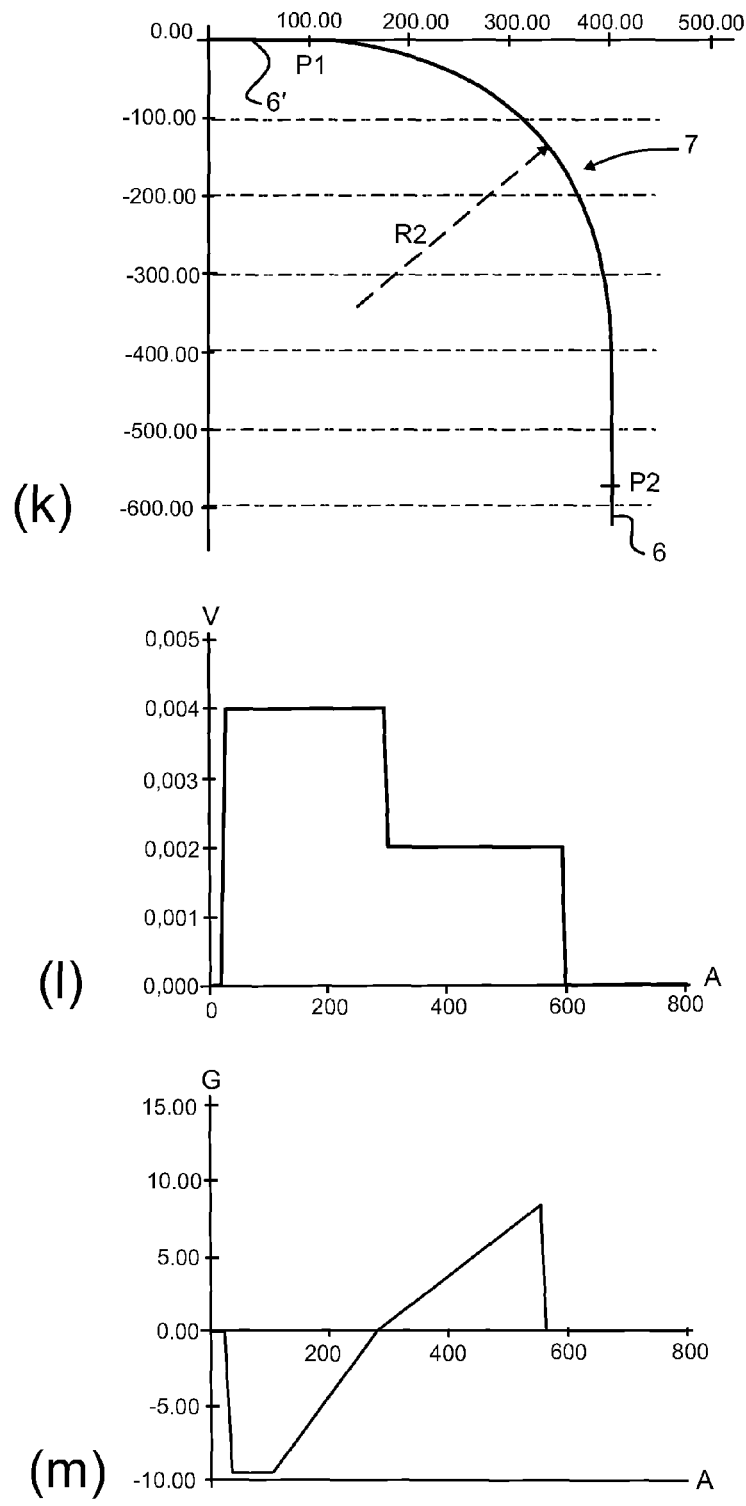

FIG. 4 is made up of several diagrams given references (k), (l), and (m) respectively, in which, taking into account said reference value of a given radius of curvature:

the diagram (k) shows the shape of a first curved zone of a frame of the present invention in a first embodiment, said first curved zone being geometrically defined by a first varying radius of curvature;

the diagram (l) shows the variation in the value (V) of a said first varying radius of curvature as a function of the said curvilinear abscissa (A); and the diagram (m) shows the variation of the delamination stress flux (G) withstood by a first flange in a said first curved zone as a function of the said curvilinear abscissa (A).

Figure 5:
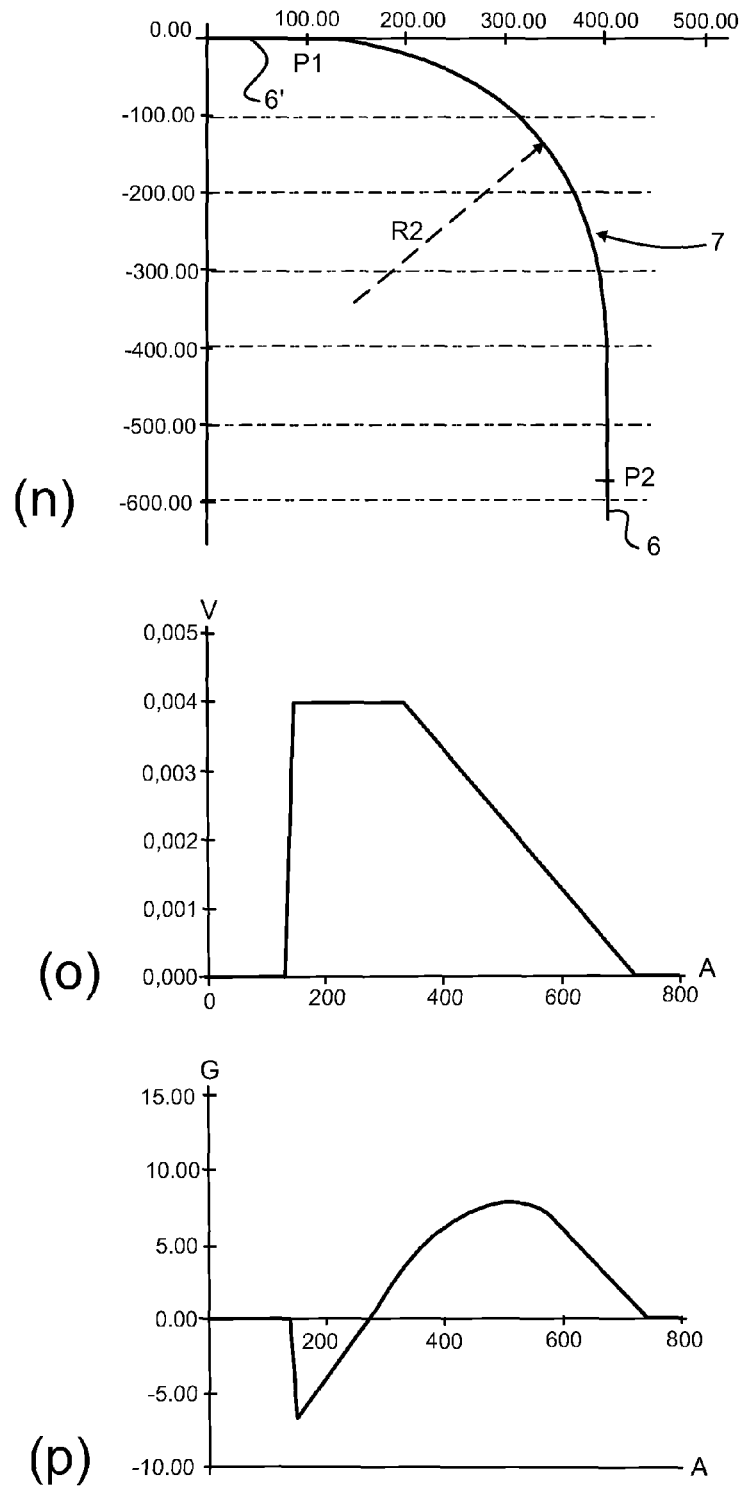

FIG. 5 is made up of several diagrams given references (n), (o), and (p) respectively, in which, taking into account said reference value of a given radius of curvature:

the diagram (n) shows the shape of a second curved zone of a frame of the present invention in a second embodiment, said second curved zone being geometrically defined by a second varying radius of curvature;

the diagram (o) shows the variation in the value (V) of a said second varying radius of curvature as a function of the said curvilinear abscissa (A); and the diagram (p) shows the variation of the delamination stress flux (G) withstood by a second flange in a said second curved zone as a function of the said curvilinear abscissa (A).

Figure 6:
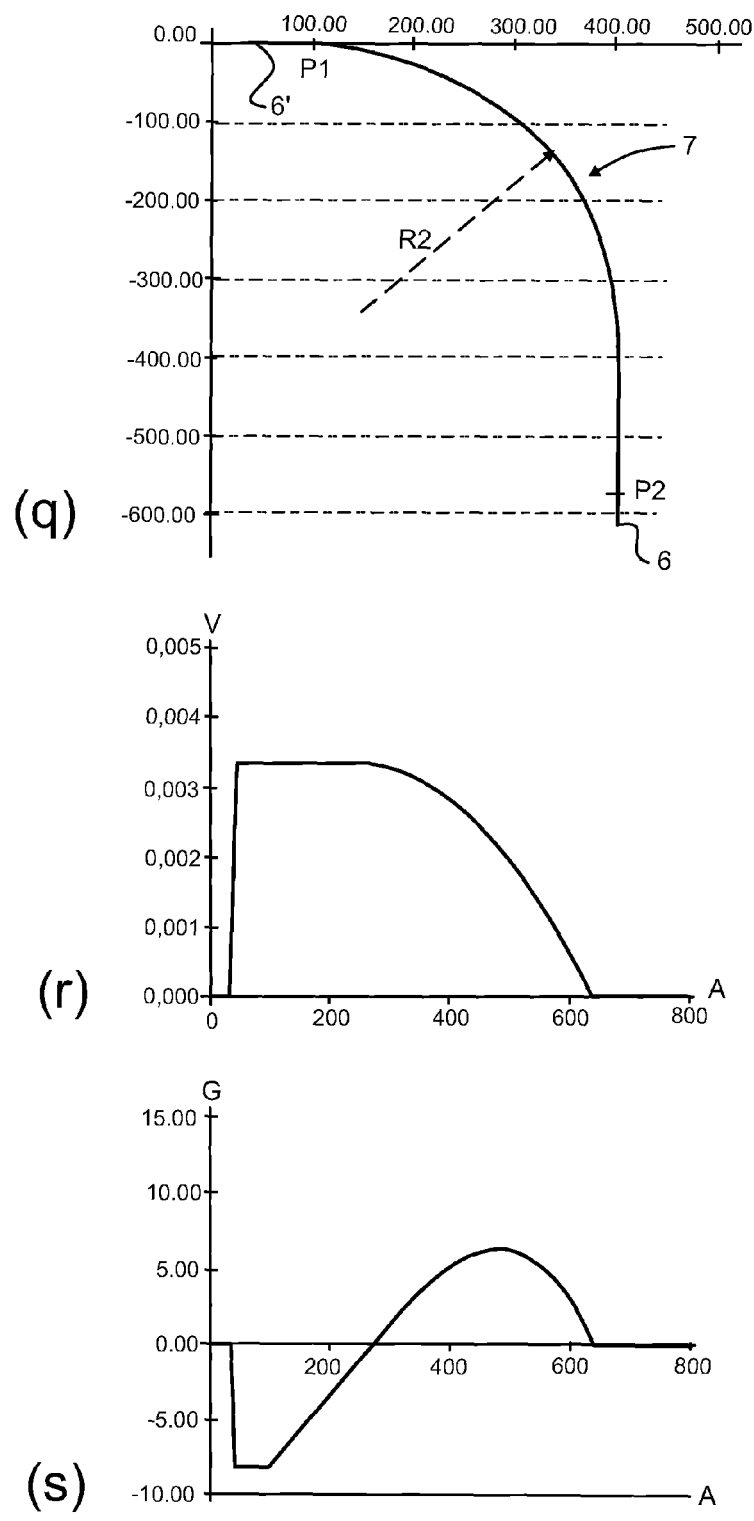

FIG. 6 is made up of several diagrams given references (q), (r), and (s) respectively, in which, taking into account said reference value of a given radius of curvature:

the diagram (q) shows the shape of a third curved zone of a frame of the present invention in a third embodiment, said third curved zone being geometrically defined by a third varying radius of curvature;

the diagram (r) shows the variation in the value (V) of a said third varying radius of curvature as a function of the said curvilinear abscissa (A); and the diagram (s) shows the variation of the delamination stress flux (G) withstood by a third flange in a said third curved zone as a function of the said curvilinear abscissa (A).

DETAILED DESCRIPTION OF THE INVENTION

In FIG. 1, a frame 1 constituting a transverse structural element of an aircraft fuselage is formed from a profile 8. In the embodiment shown, the profile 8 is more specifically in the form of a closed loop so as to form a closed frame.

The profile 8 is built up from laminated composite materials having various layers that are constituted by sheets or woven fabrics that are conventionally formed by fibers made of a strong material, referred to as "reinforcement", that are embedded in a matrix, such as a resin matrix for example, having strength that is much lower than that of said strong material.

In the embodiment shown, the profile 8 comprises a core 2 lying between an inside flange 3 facing towards the inside recess 4 of the frame 1 and an outside flange 5 facing towards the outside of the frame 1.

The frame 1, shown by way of example, is in particular a structural element of a fuselage locally defining its transverse profile that is considered as being transverse relative to the typical direction in which the fuselage extends longitudinally. In such a context, the inside recess 4 of the frame 1 consequently defines the space available in the cabin formed by the fuselage of the aircraft. The frame 1 comprises various zones to be joined together such as 6, 6', 6" extending in respective directions, said zones to be joined being interconnected by critical curved zones such as 7, 7'.

The frame 1 is possibly subjected to the forces C1 and C2 that conventionally generate perpendicular angle stresses in the flanges 3, 5 and shear stresses in the core 2 of the profile 8. The action of the perpendicular angle stresses in the inside flange 3 in traction is equal to the action of a force F putting an element E of said inside flange 3 into traction, the element lying between two sections S1 and S2 that are infinitesimally close, as shown in the detail of the frame visible in FIG. 1, for example.

However, curved zones 7, 7' of the frame 1 can break as a result of the perpendicular angle stresses in traction exerted in particular on the inside flange 3 along the circumference of said inside flange 3, i.e. under the effect of the forces C1, C2 applied to the frame 1 and of the bending moment that results from said applied forces C1, C2 and that is of axis that is perpendicular angle to the core 2. In equilibrium, said perpendicular angle stresses in the curved zones 7, 7' of the frame 1 generates stresses, referred to as "delamination stresses", and may thus lead to delamination of the profile 8.

The delamination stresses are perpendicular to the plane of the inside flange 3, as shown along the arrow $\underline{f}$ in FIG. 1. The field of the delamination stresses must then be taken up merely by the sheets or fabrics being bonded together adhesively, which applies traction stresses to the matrix, even though its strength is lower than that of the fibers.

FIG. 2 shows various examples of shapes for the cross section of a profile 8 from which a frame is formed, such as the frame shown for example in FIG. 1, these shapes being shown on a purely illustrative basis in respective diagrams (a), (b), (c), (d), (e), and (f). In these various embodiments, the profiles 8 essentially comprise a core 2 lying between an inside flange 3 and an outside flange 5.

A curved zone of a frame that interconnects two zones 6', 6 of the frame for connecting together is considered in FIGS. 3 to 6. The curved zone 7 is geometrically defined by a radius of curvature R1, R2 that is typically defined by a value and by a center of curvature having a position that is invariable relative to the inside periphery of the frame 1 facing towards the inside recess 4 of the frame 1. The values of the radii of curvature R1, R2 are each identified relative to a reference value. By way of example, account is taken of a reference radius of curvature having a value of the order of 300 mm for a curved zone 7 of the order of 471 mm for example.

Since the zones for connecting together 6, 6' of the frame 1 are considered as being rectilinear in the embodiments shown, a radius of curvature of infinite value is considered as geometrically defining each zone for connecting together 6, 6'. Also considered is a reference point P1 from which the value of the radius of curvature R1, R2 is defined, thus defining the curved zone 7 of the frame.

Such a reference point P1 may potentially be placed at any point of the curved zone 7 of the frame. In the example shown, a reference point P1 is considered that corresponds to a first junction point between the curved zone 7 and a first zone to be joined 6 with another one by the way of the said curved zone 7.

In this context and by way of example, the reference point P1 is positioned on a value of the curvilinear abscissa A of 100 mm (see FIG. 3(g)). The curvilinear abscissa of the radius of curvature R1, R2 defining the curved zone 7 of the frame extends until it reaches a second junction point P2 of the curved zone 7 with a second zone for connecting together 6' of the frame. The second junction point P2 is positioned on a value of the curvilinear abscissa of the order of 571 mm, for example.

In addition, consideration is given to a tolerable threshold value for delamination stresses, beyond which threshold value a risk of delamination of the profile would be confirmed by a crack being initiated and propagating. Such a threshold value is potentially identified relative to a reference flux for the delamination stresses, such as a reference flux having a tolerated value established at 8.00 decanewtons per millimeter (daN/mm).

Figure 3:
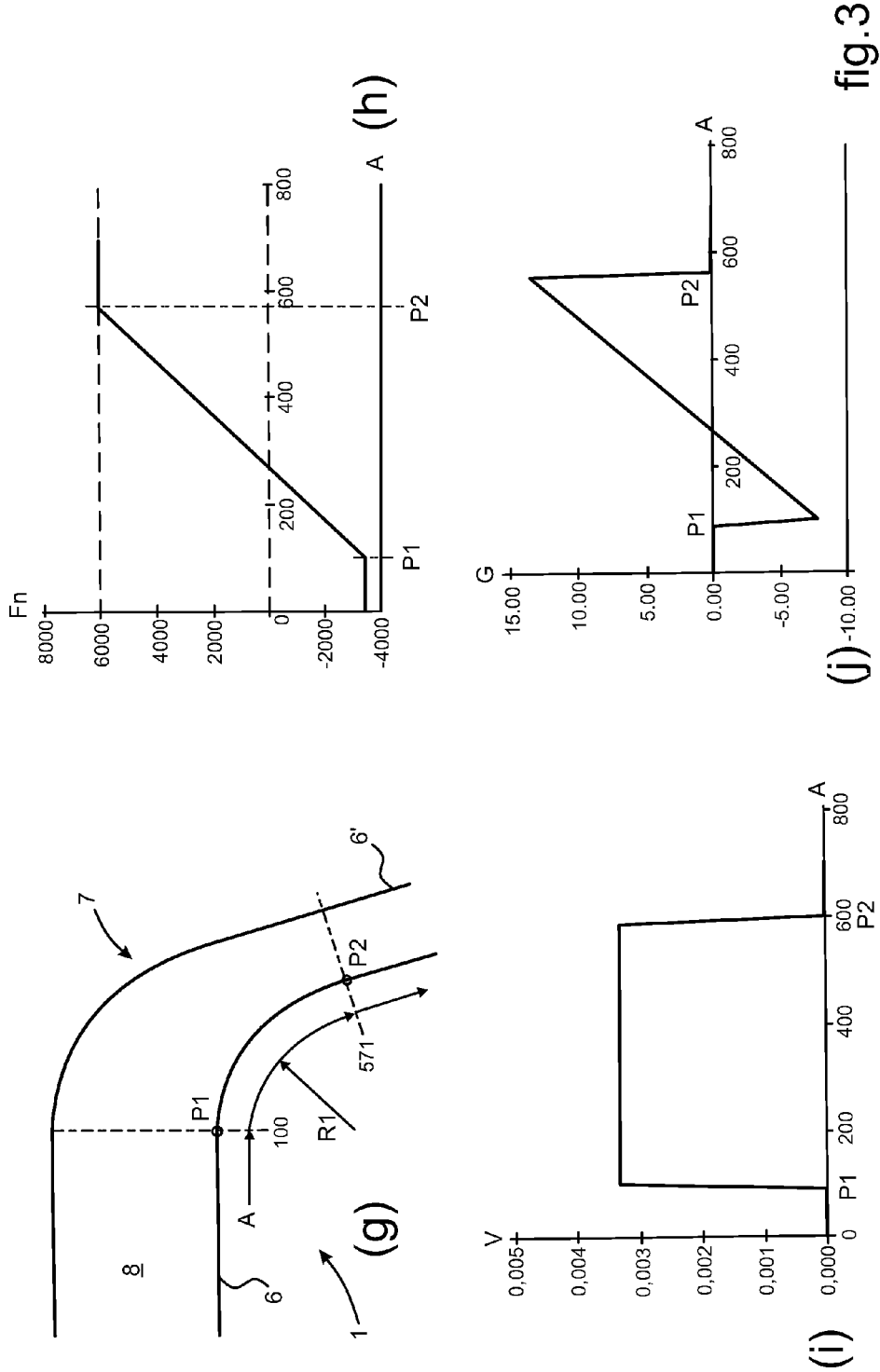
FIG. 3 is made up of several diagrams given references (g), (h), (i), and (j) respectively, in which for a reference value of a given radius of curvature.

In FIG. 3, the diagram (g) shows a curved zone 7 of a prior art frame 1 that interconnects two zones to be joined together 6, 6' of the frame 1 and the diagram (h) shows the variation of the perpendicular angle force Fn in the inside flange, the positive and negative values corresponding respectively to zones in traction and in compression.

In the diagram (i) of FIG. 3, the curved zone 7 is geometrically defined by a constant curvature V corresponding to a constant reference value for the radius of curvature equal to 300 mm. The diagram (i) shows the variation of the curvature V of the curved zone 7, it being recalled that said curvature V is the reciprocal of the radius of curvature. Thus curvature V of zero corresponds to a radius of curvature that is infinite.

In the diagram (j) it can be seen that the flux of the delamination stresses G can reach 13.00 daN/mm, which is greater than the value of the reference flux. A sudden variation in the gradient of the flux of the delamination stresses is also observed at the second junction point P2.

In FIGS. 4 to 6, the radius of curvature that defines a curved zone 7 of a frame has a value that varies according to the curvilinear abscissa, the value of the radius of curvature, then referred to as the varying radius of curvature R2, varies going away from the reference point P1.

Various examples of such varying radii of curvature R2 are shown respectively in the diagrams (k), (n), and (q).

In the various embodiments shown in FIGS. 4 to 6, the variation in the value of the varying radius of curvature R2 is defined by clothoids, so that the flux of the delamination stresses is caused to decrease locally so as not to exceed the reference flux.

For a given dimension of the cross section of the profile forming the frame, delamination of the inside flange of the profile is avoided compared with the same profile being used in a frame having curved zones defined by a constant radius of curvature.

In this context when the aircraft is in a flight situation, delamination of the profile can be avoided by increasing the value of the varying radius of curvature R2 in the vicinity of the second junction point P2. Relative to a crash situation of the aircraft, it is possible to reduce the value of the varying radius of curvature R2 a little in the first junction zone P1. However, delamination may arise and this situation is only possible when a sufficient margin is conserved in the final failure threshold of the inside flange.

By way of example, in diagrams (l) and (m) of FIG. 4, the variation in the value of the curvature V makes it possible to locally adapt the value of the varying radius of curvature R2 depending on requirements. In the zone of the first junction point P1, the value of the varying radius of curvature R2 relative to the reference value of 300 mm may be reduced to 250 mm (curvature V of 0.004 mm$^{-1}$). The delamination stresses are applied to the profile in compression and are not considered to be dangerous, the flux of delamination stresses G being at a value that is lower than the reference flux of 8.00 daN/mm.

In the vicinity of the second junction point P2, the value of the varying radius of curvature R2 relative to the reference value of 300 mm may be increased by 200 mm. The radius of curvature R2 then has a value of 500 mm (curvature V of 0.002 mm$^{-1}$). The flux of delamination stresses G is reduced to a value lower than the value of the reference flux of 8.00 daN/mm.

Such a solution in accordance with FIG. 4 thus corresponds to a curved zone of the frame that is geometrically defined by two successive radii of curvature each having constant respective values that are distinct between said two successive radii of curvature.

However, a sudden variation in the gradient of the flux of the delamination stresses is observed in particular at the junction point P2, and the bulkiness of the cross section of the profile may be further reduced. This shows that the variation in the value of the varying radius of curvature R2 merits being improved.

To this end, and once more by way of example, in the diagrams (o) and (p) of FIG. 5, a proposal is made for avoiding a sudden variation in the gradient of the flux of the delamination stresses and for reducing the bulkiness of the cross section of the profile as much as possible.

In the vicinity of the first junction point P1, a reduction to 250 mm for the value of the varying radius of curvature R2 relative to the reference value of 300 mm may be performed (curvature V of 0.004 mm$^{-1}$) in order to obtain the same advantages as those mentioned by way of example, and shown in FIG. 4.

In the vicinity of the second junction point P2, the value of the varying radius of curvature R2 increases gradually from 250 mm until it reaches an infinite value. The flux of delamination stresses G is reduced to a value lower than the value of the reference flux of 8.00 daN/mm, without leading to any sudden variation in the gradient of the flux of delamination stresses G. In addition, the bulkiness of the cross section of the profile is reduced thereby optimizing the volume of the inside recess of the frame.

Still by way of example, in FIG. 6, the diagrams (r) and (s) propose a variation in the value of the varying radius of curvature R2 as a function of the square of the curvilinear abscissa. However, a reasonable but unwanted increase in the cross section of the profile is observed.

More particularly, the value of the varying radius of curvature R2 can be maintained at the reference value of 300 mm (curvature V of 0.0033 mm$^{-1}$) in the vicinity of the first junction point P1, since the delamination stresses are applied to the profile in compression and are not considered to be dangerous. Next, the value of the varying radius of curvature R2 gradually increases proportionally to the square the curvilinear abscissa A. Sudden variation of the gradient of the flux of the delamination stresses is again avoided.

It is clear that the various values indicated in the embodiments of the invention shown, such as: the values for the reference radius of curvature and the reference flux of the delamination stresses; the values of the positions of the junction points P1 and P2 and of the reference point P1; as well as the variations in the value of the varying radius of curvature R2 and the ways in which it is varied; are to be considered as illustrating various possibilities for varying the value of the varying radius of curvature R2 as a function of the general dimensions of the frame and as a function of requirements, while taking account of the looked-for capacities for localized resistance to delamination of the profile so as to achieve the objects of the invention.

What is claimed is:

1. A structural frame of an aircraft fuselage, said frame including curved zones interconnecting together zones to be joined; said zones to be joined are located at respective ends of a given curved zone, the frame being formed by a profile made of laminated composite materials comprising a core bordered at least by one inside flange facing towards an inside recess of the frame, each of the curved zones of the frame being geometrically defined by at least one radius of curvature;

wherein said at least one radius of curvature geometrically defining at least one curved zone of the frame at least in part, is variable, having a value that varies as a function of a curvilinear abscissa of each points on an inside periphery of the inside flange facing towards the inside recess of the frame, from any point of the curved zone relative to a given reference point.

2. A frame according to claim 1, wherein a variation in the value of a varying radius of curvature is defined linearly according to a clothoid as a function of the curvilinear abscissa.

3. A frame according to claim 1, wherein a variation in the value of a varying radius of curvature is defined by the square of the curvilinear abscissa.

4. A frame according to claim 1, wherein at least one curved zone of the frame is geometrically defined by at least two distinct successive radii of curvature, at least one of which is a varying radius of curvature.

5. A frame according to claim 4, wherein among said successive radii of curvature, at least a first radius of curvature is a radius of curvature of constant value, and at least a second radius of curvature is a said varying radius of curvature.

6. A frame according to claim 4, wherein the successive radii of curvature are said varying radii of curvature.

7. A frame according to claim 1, wherein a value of the varying radius of curvature defining the curved zone at least in part, is established lower than a threshold value that is predefined by a resistance of the profile to delamination under given stressing conditions of the profile on board the aircraft.

* * * * *